United States Patent [19]

Lazarus et al.

[11] 4,061,708

[45] Dec. 6, 1977

[54] STABILIZED POLYAMIDES

[75] Inventors: Stanley David Lazarus, Petersburg; Julian Harold Newland, Richmond, both of Va.

[73] Assignee: Allied Chemical Corporation, Morris Township, N.J.

[21] Appl. No.: 758,258

[22] Filed: Jan. 10, 1977

[51] Int. Cl.² .............................................. C08K 5/56
[52] U.S. Cl. .................................... 264/211; 264/340; 260/33.6 R; 260/78 S; 260/45.75 C; 260/857 L
[58] Field of Search .................... 260/45.75 C, 857 L, 260/78 S, 33.6 R; 264/211, 340

[56] References Cited

U.S. PATENT DOCUMENTS

| 2,705,227 | 3/1955 | Stamatoff | 260/45.7 P |
| 3,189,575 | 6/1965 | Horn et al. | 260/45.75 |
| 3,523,916 | 8/1970 | Needham et al. | 260/42.57 |

FOREIGN PATENT DOCUMENTS 1,030,363   5/1966   United Kingdom.

*Primary Examiner*—V. P. Hoke
*Attorney, Agent, or Firm*—Fred L. Kelly

[57] ABSTRACT

An improved polyamide characterized by resistance to thermal-oxidative degradation consisting essentially of a polyamide having a stabilizing amount of copper II dichloro bis (pyridine) or copper II dichloro bis (quinoline) incorporated therein. In a continuous process, the stabilizing compound is preferably added as a dispersion in an inert carrier liquid.

1 Claim, No Drawings

STABILIZED POLYAMIDES

CROSS-REFERENCE TO RELATED APPLICATIONS

This application is related to U.S. application Ser. No. 752,483 filed Dec. 20, 1976.

BACKGROUND OF THE INVENTION

This invention relates to improved polyamides and to methods for their preparation. More particularly, the invention relates to improvement in the preparation of fibers, filaments and yarns from polyamides modified for enhanced resistance to thermal-oxidative degradation.

The polyamide synthetic resins have many valuable properties that have resulted in their well known widespread use in industry and in the arts. They have recurring amide groups as an integral part of the main polymer chain and are capable of being formed into filaments. Methods of their preparation and examples of their many uses are described in U.S. Pat. Nos. 2,071,250, 2,071,253, 2,130,948 and 2,241,322. Possibly two of the more outstanding properties of these resins which contribute to a large extent to their utility are their physical strength and unusual toughness. These properties are so superior to like properties of competitive resins that appreciable losses in the physical properties of polyamides can occur over a period of time without falling to the highest level of those properties of competitive resins. However, it is well known that the polyamides, in common with other organic materials, are subject to various degradation reactions upon exposure to extreme atmospheric conditions, and a number of methods have been proposed for stabilizing polyamides against such exposure, particularly exposure to heat. One successful method of stabilization is provided in French Pat. No. 906,893, which teaches that an improved polyamide may be prepared by incorporating in the polymer a small amount of a copper salt such as copper acetate. This method of stabilization is further amplified in U.S. Pat. No. 2,705,227, where it is disclosed that the stabilizing effect of copper compounds is greatly enhanced by adding an inorganic halide such as potassium iodide along with the copper compound. However, it is generally recognized that alternative procedures are needed that can produce this greatly enhanced stabilization without said addition of an inorganic halide such as potassium iodide along with the copper compound.

More recently, U.S. Pat. No. 3,833,542 to S. D. Lazarus et al. discloses an improved high molecular weight linear polyester having a small amount of dichloro (di-2-pyridylamine) copper (II) or bis (di-2-pyridylamine) copper (II) chloride incorporated therein to improve thermal stability. Unfortunately, these copper complex compounds do not work well as stabilizers for polyamides, as demonstrated in the specific examples herein.

SUMMARY OF THE INVENTION

The present invention provides an improved fiber-forming polyamide and a process for preparing it. The invention further provides polyamide fibers which have excellent resistance to thermal-oxidation degradation, which properties are particularly important when the polyamide fibers are used in commercial articles, such as tires, industrial belting, etc. wherein a high degree of heat is normally built up during use. Other objects will become apparent in the course of the following description.

In accordance with the above objects, it has now been discovered that an improved fiber-forming polyamide is obtained by incorporating therein a stabilizing amount of copper II dichloro bis(pyridine) or copper II dichloro bis (quinoline) to improve thermal-oxidative stability.

The amount of the stabilizer, copper II dichloro bis (pyridine) or copper II dichloro bis (quinoline), incorporated in the polyamide generally ranges from about 40 to about 500 parts per million copper, and preferably from about 40 to about 300 parts per million copper, based upon the polyamide. Normally, the polymer has a relative viscosity of at least 60.

To minimize the possibility of gel formation in the polymer, the stabilizer is preferably incorporated in the polyamide polymer after the polymerization reaction in subsequent treatment steps prior to melt spinning. In a continuous process the stabilizer is preferably added as a dispersion in an inert carrier, e.g., as a dispersion in liquid polyisobutene. The improved polyamide of the present invention is obtained without difficulties in the processing thereof, i.e., the addition of the present copper compounds requires no change in the process of polymerizing the polymer nor in the spinning and drawing procedures for preparing yarn from the polymer.

Other additives can be added to the polymer with complete compatibility therewith to control or tailor the reactions in order to obtain required characteristics of the final polymer for specific end uses. Many such additives are known and utilized to control dyeing, static, luster, flammability, light stability, brightness, etc.

Copper II dichloro bis(pyridine) and copper II dichloro bis (quinoline) are known compounds which are solids at ordinary temperatures. They can be prepared from cupric chloride and the organic base in accordance with the procedure furnished in the specific examples herein.

DESCRIPTION OF THE PREFERRED EMBODIMENTS

One preferred embodiment of the present invention may be briefly stated as follows: In a process of melt-spinning yarn from a synthetic polyamide, a method of providing a heat-resistant, oxidation-resistant polyamide yarn which comprises adding to the polyamide after the final polymerization of the polyamide a stabilizing compound selected from the group consisting of copper II dichloro bis(pyridine) and copper II dichloro bis(quinoline), said stabilizing compound being added in an amount sufficient to provide about 40 to about 300 parts per million copper based on the polyamide, blending the polyamide with the stabilizing compound, and then melt extruding the polyamide to produce the heat-resistant, oxidation-resistant polyamide yarn.

In a conventional melt-spinning process starting with polyamide polymer chips, e.g., polycaproamide chips, the stabilizing compound may be added to the polymer chips immediately prior to spinning.

In a continuous process, the stabilizing compound is preferably added to the process stream at a point where the polymer is molten by forming a stable dispersion comprising a liquid polyisobutene and the solid stabilizing compound, and continuously injecting the dispersion with mixing into the polymer melt after the final polymerization. Preferably, the liquid polyisobutene has a viscosity of about 3 to 70 poise at 20° C., the solid stabilizing compound is ground to an average particle size of 2 microns or less in diameter, and the solid stabilizing compound is dispersed in the polyisobutene at a concentration of 10 to 60 weight percent based on the total weight of the dispersion.

The preferred polyisobutenes may be produced by catalytic polymerization of an isobutene rich stream. They are commercially available as polybutenes from Chevron Chemical Company, and several grades are available having different viscosities. The backbone of the commercial polybutene is essentially that of polyisobutene, although some 1-butene and 2-butene may be incorporated. Each molecule contains one double bond in either the alpha or beta position.

In order to illustrate the present invention, the following examples are given which exemplify the invention but should not be regarded as limiting the same. The parts and percentages employed are by weight unless otherwise indicated.

For use in Examples 1 to 6 a master batch of polyepsilon caproamide (nylon 6) chips is obtained from a large plant production batch. This polymer is prepared by the polymerization of epsilon caprolactam without introduction of any other chemical component except water employed as a polymerization initiator. This polymer has a relative viscosity of 95.

EXAMPLE 1

To 1,000 grams of the nylon 6 polymer chips is added 0.216 gram of copper II dichloro bis(pyridine). The chips and additive are blended to assure uniformity, melted in an extruder, and spun in the conventional manner. The tenacity of the resulting fiber is 8.3 grams/denier; thermal-oxidative stability is tested in accordance with Example 6.

EXAMPLE 2 (Comparative Example)

Example 1 is repeated except that no additive is introduced. The tenacity of the resulting fiber is 8.3 grams/denier; thermal-oxidative stability is tested in accordance with Example 6.

EXAMPLE 3

Example 1 is repeated except that 0.29 gram of copper II dichloro bis(quinoline) is added. The tenacity of the resulting fiber is 8.4 grams/denier; thermal-oxidative stability is tested in accordance with Example 6.

EXAMPLE 4 (Comparative Example)

Example 1 is repeated except that 0.225 gram of dichloro(di-2-pyridylamine) copper (II) is added. The tenacity of the resulting fiber is 8.3 grams/denier; thermal-oxidative stability is tested in accordance with Example 6.

EXAMPLE 5 (Comparative Example)

Example 1 is repeated except that 0.12 gram of copper II chloride dihydrate is added. The tenacity of the resulting fiber is 8.6 grams/denier; thermal-oxidative stability is tested in accordance with Example 6.

EXAMPLE 6

The fibers obtained in Examples 1–5 are twisted and plyed to form 2-ply cords of the type used in pneumatic tires. These cords are then evaluated for their thermal-oxidative stability.

The thermal-oxidative stability of the cords is measured in a test wherein the cords, mounted on metal spools, are exposed for 24 hours at 165° C. in an oven having an air atmosphere. The cords are so wrapped and fastened on the metal spools that the cords are held to their original length during heat treatment. A measure of thermal stability is obtained by comparing the loss in breaking strength of the heat treated sample with a control consisting of similarly spool wound samples which are not placed in the air oven. Results of this testing are found in the following table, which shows that superior thermal stability is obtained with use of the copper compounds of the present invention.

TABLE I

| Polymer Additive | Percent Additive | Parts per Million CU | Tenacity Grams/Denier | Percent of Original Breaking Strength Retained After Heating 24 Hours at 165° C. in Air Oven |
|---|---|---|---|---|
| None | — | — | 8.3 | 28 |
| Copper II chloride dihydrate | 0.012 | 45 | 8.6 | 33 |
| Dichloro(di-2-pyridylamine) copper (II) | 0.0225 | 47 | 8.3 | 70 |
| Copper II dichloro bis(pyridine) | 0.0216 | 47 | 8.3 | 93 |
| Copper II dichloro bis(quinoline) | 0.0290 | 47 | 8.4 | 99 |

EXAMPLE 7

This example demonstrates a preferred process for continuous production of thermally stabilized polycaproamide containing a stabilizing amount of a copper compound of the present invention.

About 250 parts of copper II dichloro bis (pyridine) and 250 parts of polyisobutene having a viscosity of about 25 poise at 20° C. are mixed together in a high-shear mixer for 15 minutes. A stable dispersion with no lumps or aggregates is produced which does not precipitate solids after standing for 14 days. This dispersion is ball-milled for 48 hours. Microscopic examination then reveals no aggregates greater than 2 microns in diameter with average particle size between 0.1 and 1.5 microns in diameter. For convenience, this dispersion is called Dispersion A.

Over a period of about 3 weeks, about 100 parts per hour of e-caprolactam is continuously fed to a stirred reactor operating at a temperature of 265° C., together with steam at a pressure of about 50 psig to form a prepolymer melt.

Polymerization is continuously accomplished in a series of three stirred reactors operated at conditions described in U.S. Pat. No. 3,109,835 to Apostle, i.e., the water and part of the unreacted lactam is continuously removed from the prepolymer melt by smoothly stirring the reaction melt at about atmospheric pressure at a temperature of about 265° C. while sweeping the surface of the smoothly stirred reaction mixture with dry nitrogen gas at a rate of about 3–4 units volumes of gas measured at standard temperature and pressure (STP) per hour per unit volume of the reaction mixture, for approximately 4 hours. The final reactor may be operated at reduced pressure if desired.

The resulting polymer is continuously extruded into a warm water bath and chopped into pellets 1/10 by 1/10 inch in size. The pellets are then hot water washed at 100° C. to reduce the content of hot water soluble constituents to about 1–2%; and the pellets are dried to less than 0.2% moisture. The polymer is a white solid having a relative viscosity of about 60 as determined by concentration of 11 grams of polymer in 100 milliliters of 90 percent formic acid at 25° C. (ASTM-689-62T).

The polycaproamide pellets are melted at 260°–285° C. and mixed for 10 minutes with about 0.05 part of Dispersion A per 100 parts of lactam in the polymer, then melt-extruded under a pressure of about 1,500 psig through a 136-orifice spinnerette to produce 4,100-denier fiber. The fiber is then collected and drawn about 5 times its extruded length to produce 840-denier yarn. The tenacity of the yarn is 9.0 grams/denier. When this yarn is tested for thermal-oxidative stability in accordance with the procedure of Example 6, 93 percent of the original breaking strength is retained after heating the yarn 24 hours at 165° C. in the air oven.

In additional tests, continuous injection of Dispersion A into the molten polymer stream is readily accomplished by means of a conventional gear-pump metering system. Incorporation of Dispersion A in these tests is in the range of 0.05–0.2 percent of the lactam in the polymer.

EXAMPLE 8

A series of dispersions are prepared in accordance with the preparation of Dispersion A of Example 7 except that a series of polyisobutenes manufactured by Chevron Chemical Company is used. These commercial materials differ in molecular weight and viscosity and are designated by Chevron as "Polybutenes." The following table indicates typical viscosity of various Polybutenes.

|  | Viscosity, Poise at about 20° C. |
|---|---|
| Polybutene No. 6 | 0.6 |
| Polybutene No. 8 | 3.0 |
| Polybutene No. 12 | 25.0 |
| Polybutene No. 16 | 39.0 |
| Polybutene No. 18 | 66.0 |
| Polybutene No. 24 | 356.0 |
| Polybutene No. 32 | 1188.0 |

It is found that a dispersion made as described in Example 7, but Polybutene No. 6 is unsuitable for use in the process of the present invention because such dispersion is not stable, i.e., settling of solids quickly occurs. With use of Polybutene No. 8, 12, and 16, stable dispersions can be prepared, i.e., no settling of solids occurs when dispersions are allowed to stand for 3 days. Moreover, dispersions made with Polybutenes No. 12 and 16 are very stable, i.e., no settling of solids occurs when the dispersions are allowed to stand for 14 days. Polybutene 18 is viscous to prepare dispersions at 20° C.; however, stable dispersions can be prepared if the Polybutene is heated to about 80° C. Polybutenes 24 and 32 are too viscous for use in the process of this invention.

EXAMPLE 9

This example demonstrates a suitable procedure for preparation of the copper compounds used in the process of the present invention.

About 4 parts of $CuCl_2$ is dissolved in 79 parts of anhydrous ethanol. This solution is filtered to remove insolubles. Then, a solution of 4.7 parts of pyridine in 158 parts of anhydrous ethanol is slowly added to the $CuCl_2$ solution, with stirring. A precipitate is formed. It is filtered and washed with ethanol and dried. The product is copper II dichloro bis(pyridine).

A similar procedure is used to make copper II dichloro bis (quinoline).

We claim:

1. In a process of melt-spinning yarn from a synthetic polyamide having a relative viscosity of at least 60, the improvement which consists of incorporating in said polyamide a stabilizing amount of a copper compound selected from the group consisting of copper II dichloro bis(pyridine) and copper II dichloro bis(quinoline), said process being further characterized in that said copper compound is incorporated in said polyamide when said polyamide is in the molten state immediately prior to spinning, by forming a stable dispersion comprising a liquid polyisobutene and said copper compound and injecting the dispersion with mixing into said molten polyamide, said liquid polyisobutene having a viscosity of 3 to 70 poise at 20° C., and said dispersion containing 10 to 60 weight percent of said copper compound.

* * * * *